W. S. McLean,
Pruning Implement,
No 51,899.    Patented Jan. 2, 1866.
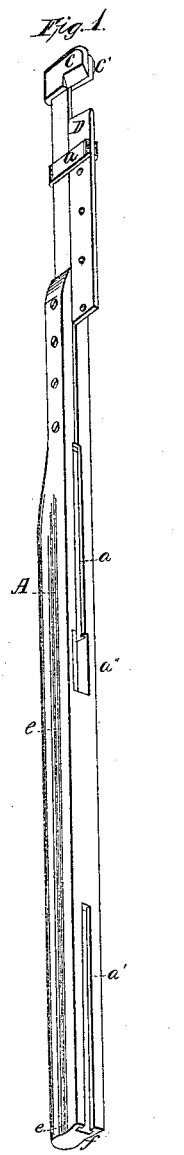
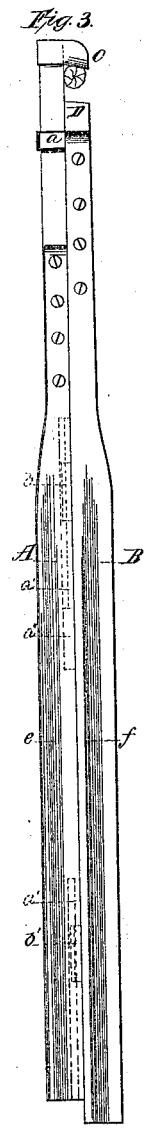

United States Patent Office.

WILLIAM S. McLEAN, OF WILLIAMSBURG, OHIO, ASSIGNOR TO HIMSELF AND VOLNEY STOCKTON, OF SAME PLACE.

IMPROVEMENT IN PRUNING-HOOKS.

Specification forming part of Letters Patent No. 51,899, dated January 2, 1866.

*To all whom it may concern:*

Be it known that I, WILLIAM S. McLEAN, of Williamsburg, Clermont county, Ohio, have invented a certain new and useful Pruning Implement; and I do hereby declare the following to be a full, clear, and exact description thereof, reference being had to the accompanying drawings, making part of this specification.

My invention relates to implements adapted to prune the higher branches of trees, and to be operated through any desired length of handle by a person standing on the ground; and it consists in making the handle of the instrument in two parts or rods, so grooved and interlocked together as to be capable of sliding one upon the other, the cutting action being effected directly by a blow or thrust applied in an upward direction to the lower end of one of the said rods.

Figures 1 and 2 represent the instrument separated so as to expose the grooved attachment. Fig. 3 represents the instrument complete.

The part or rod A of the handle A B has undercut grooves or excavations $a$ $a'$ to receive the tenons $b$ $b'$ of the part or rod B, an enlargement, $a''$, being provided to admit the upper tenon, $b$. The said tenons and grooves serve to hold the rods A and B firmly to each other, while permitting one to be slid upon the other.

To the upper extremity of the rod A is attached a double knife-edged hook, C C', which coacts with a chisel, D, having a double chamfer or basil and being secured to the upper extremity of the rod B. A loop or stirrup, $d$, attached to the shank of the chisel D and inclosing that of the double hook C C', restricts the cutters to their proper motions.

The cutting-edges may be formed straight for a direct percussion cut or in a curved or slanting shape for a shear cut. The sides of the rods A and B may be hollowed or fluted, as at $e$ and $f$, so as to afford a firm hold for the fingers of the operator.

Operation: A bough or limb having been caught under the two-edged hook C C', as at Fig. 3, the rod B is thrust forcibly upward, so as to bring the cutters to close upon opposite sides of the limb with a blow, and thus sever the part.

I claim herein as new and of my invention—

The arrangement of rods A and B, tenons and grooves $a$ $a'$ $b$ $b'$, double knife-edged hook C C', and chisel D, adapted to act by percussion, in the manner set forth.

In testimony of which invention I hereunto set my hand.

WILLIAM S. McLEAN.

Witnesses:
GEO. H. KNIGHT,
WM. H. STANDISH,
GEO. L. SWING.